(12) United States Patent
Ge (10) Patent No.: US 6,950,191 B2
(45) Date of Patent: Sep. 27, 2005

(54) METHOD OF EXTRACTING CIRCULAR REGION FROM FRINGE IMAGE

(75) Inventor: Zongtao Ge, Saitama (JP)

(73) Assignee: Fujinon Corporation, Saitama (JP)

(*) Notice: Subject to any disclaimer, the term of this patent is extended or adjusted under 35 U.S.C. 154(b) by 243 days.

(21) Appl. No.: 10/449,790

(22) Filed: Jun. 2, 2003

(65) Prior Publication Data

US 2004/0001195 A1 Jan. 1, 2004

(30) Foreign Application Priority Data

Jun. 28, 2002 (JP) ........................................ 2002-191404

(51) Int. Cl.[7] .............................................. G01B 9/02
(52) U.S. Cl. ..................................................... 356/450
(58) Field of Search ......................................... 356/450

(56) References Cited

U.S. PATENT DOCUMENTS 5,523,842 A * 6/1996 Yasuda et al. .............. 356/512
6,532,073 B2 * 3/2003 Ge ............................. 356/512
6,693,715 B2 * 2/2004 Ge ............................. 356/512
6,768,554 B2 * 7/2004 Ge ............................. 356/512
6,859,566 B2 * 2/2005 Sun ............................ 382/283

* cited by examiner

Primary Examiner—Gregory J. Toatley, Jr.
Assistant Examiner—Michael A. Lyons
(74) Attorney, Agent, or Firm—Snider & Associates; Ronald R. Snider

(57) ABSTRACT

A circular region extracting method captures onto a coordinate system a fringe image of a sample having a circular region to be analyzed within an area to be observed, binary-codes the fringe image of the area by a fringe analysis method on the coordinate system, places a plurality of linear gratings in parallel with each other with a predetermined interval on thus binary-coded coordinate system, and uses the linear gratings so as to extract a circular image region representing the region to be analyzed on the coordinate system.

7 Claims, 4 Drawing Sheets

METHOD OF EXTRACTING CIRCULAR REGION FROM FRINGE IMAGE

RELATED APPLICATIONS

This application claims the priority of Japanese Patent Application No. 2002-191404 filed on Jun. 28, 2002, which is incorporated herein by reference.

BACKGROUND OF THE INVENTION

1. Field of the Invention

The present invention relates to a method of extracting a circular region from a fringe image. The method extracts, on a coordinate system having captured a fringe image carrying phase information such as the surface form and internal refractive index of a sample having a circular region to be analyzed within an area to be observed, a circular image region representing the region to be analyzed.

2. Description of the Prior Art

Recently, research and development of optical fibers for use in optical communications has been vigorously under way. Known as an example of this kind of optical fibers is one comprising a core having an outer diameter of about 10 $\mu$m and a cladding layer, disposed at the outer periphery thereof, having an outer diameter of about 125 $\mu$m, for example, and further comprising a ferrule, disposed at a connecting end part thereof, for connecting the optical fiber to another optical fiber.

The ferrule is a cylindrical component, constituting an optical connector, for holding and securing one end of the optical fiber in order to connect it to another optical fiber. After an optical fiber is inserted and secured with an adhesive or the like to the center part of the outer diameter of a ferrule, the leading end of the ferrule is polished into a mirror surface, so that two optical fibers held by respective ferrules can be connected to each other when the leading end faces of the two ferrules are butted against each other.

While the leading end face of a ferrule has been known to be polished into a plane perpendicular to the optical axis or a plane obliquely intersecting the optical axis, attention has recently been directed to one whose leading end face is subjected to PC (physical contact) polishing so as to attain a convex spherical form such that the leading end face is elastically deformed by a pressure for butting the leading end faces of ferrules against each other.

For reducing the optical loss occurring when optical fibers are connected to each other, various high-precision specs for ferrules have been defined by JIS (Japanese Industrial Standard). For the PC-polished ferrule, six $\mu$m-order specs such as dimensional errors in the radius of curvature of the leading end face and positional deviation errors between the apex of the spherical leading end face of the ferrule and the center of the core of the optical fiber (the center of the fiber outer form) have been defined.

There are cases where a microscopic interferometer apparatus (also known as "interferometric microscope") is used for inspecting whether a produced ferrule conforms to the above-mentioned specs or not. The microscopic interferometer apparatus is configured such that interference fringes formed by interference between object light carrying phase information such as the surface form and refractive index distribution of a minute sample and reference light reflected by a predetermined reference plate are observed, and forms and changes of the interference fringes are measured and analyzed, so as to obtain the phase information of the sample.

When inspecting a manufactured ferrule by using such a microscopic interferometer apparatus, it is necessary to extract a circular image region representing an area of an optical fiber on a coordinate system having captured a fringe image of an area to be observed in a ferrule.

Conventionally known as a method of extracting such a circular image region is one in which, while a template corresponding to a reference size on a coordinate system having captured the fringe image (the size corresponding to the core region of the optical fiber in the coordinate system) is moved little by little on the coordinate system, an image region coinciding with this template is identified as the circular image region.

However, such a conventional circular region extracting method has been problematic in that it takes time to extract the circular image region, since the template must be moved little by little on the coordinate system over all the image area having captured the fringe image.

SUMMARY OF THE INVENTION

In view of the circumstances mentioned above, it is an object of the present invention to provide a method of extracting a circular region from a fringe image, which can rapidly extract a circular image region representing a circular region to be analyzed from a fringe image of an area to be observed in a sample captured onto a predetermined coordinate system.

For achieving the above-mentioned object, the present invention provides a method of extracting a circular region from a fringe image by capturing onto a predetermined coordinate system a fringe image in an area to be observed of a sample having a circular region to be analyzed within the area to be observed, and extracting a circular image region representing the region to be analyzed on the coordinate system.

This method comprises the steps of:

(i) carrying out a binary coding procedure, the binary coding procedure determining fringe intensity information of each pixel on the coordinate system by a predetermined fringe analysis method, determining according to thus determined fringe intensity information a threshold for binary-coding the fringe image in the area to be observed, and discriminating a candidate region having a fringe intensity level of the circular image region in the fringe image and a noncandidate region having a fringe intensity level of a region outside the circular image region from each other by the binary coding according to thus set threshold;

(ii) placing, on the coordinate system subjected to the binary coding procedure, a plurality of linear gratings in parallel with each other with a predetermined interval P shorter than the diameter D of the circular image region;

(iii) measuring the length of a segment constituted by a part of the linear gratings included within the candidate region;

(iv) determining whether or not the length of the segment falls within a predetermined suitable length range of the diameter D or shorter; and (v) carrying out a circular image region selecting procedure, the circular image region selecting procedure placing on the coordinate system a perpendicular bisector of the segment determined to fall within the range, measuring the length of a diameter candidate segment constituted by a part of the perpendicular bisector included within the, candidate region, determining whether or not the length of the diameter candidate segment substantially equals the diameter D, and taking an image region including thus positively determined diameter candidate segment as a chosen candidate region of the circular image region, or carrying out the circular image region selecting procedure a plurality of times while changing an inclination of the linear gratings;

thereby defining and extracting the circular image region.

Here, "carrying out a circular image region selecting procedure . . . or carrying out the circular image region selecting procedure a plurality of times while changing an inclination of the linear gratings" means that carrying out a single circular image region selecting procedure can terminate the extraction procedure if the circular image region can be defined thereby, whereas the circular image region selecting procedure can repeatedly be carried out each time the inclination of the linear gratings is changed while changing the inclination of the linear gratings until the circular image region is defined if the circular image region cannot be defined by the single circular image region selecting procedure.

The method may further comprise a first center position specifying procedure for determining, after the circular image region is extracted by the circular image region selecting procedure, a center position of the diameter candidate segment included in the circular image region and taking thus determined center position as a center position of the circular image region.

The method may further comprise a second center position specifying procedure for determining, after the circular image region is extracted by the circular image region selecting procedure, a gravity center position of the circular image region according to the area of the circular image region and taking thus determined gravity center position as a center position of the circular image region.

The predetermined interval P may be set within the range of the following expression:

$$\sqrt{3}D/2 \geq P \geq D/10$$

where D is the diameter of the circular image region.

As the predetermined fringe analysis method, a phase shift fringe analysis method or a Fourier transform fringe analysis method may be used.

As the fringe intensity information, modulation (equivalent to contrast or amplitude) may be used.

DESCRIPTION OF THE PREFERRED EMBODIMENTS

In the following, embodiments of the present invention will be explained with reference to the drawings.

First Embodiment

Figure 1:
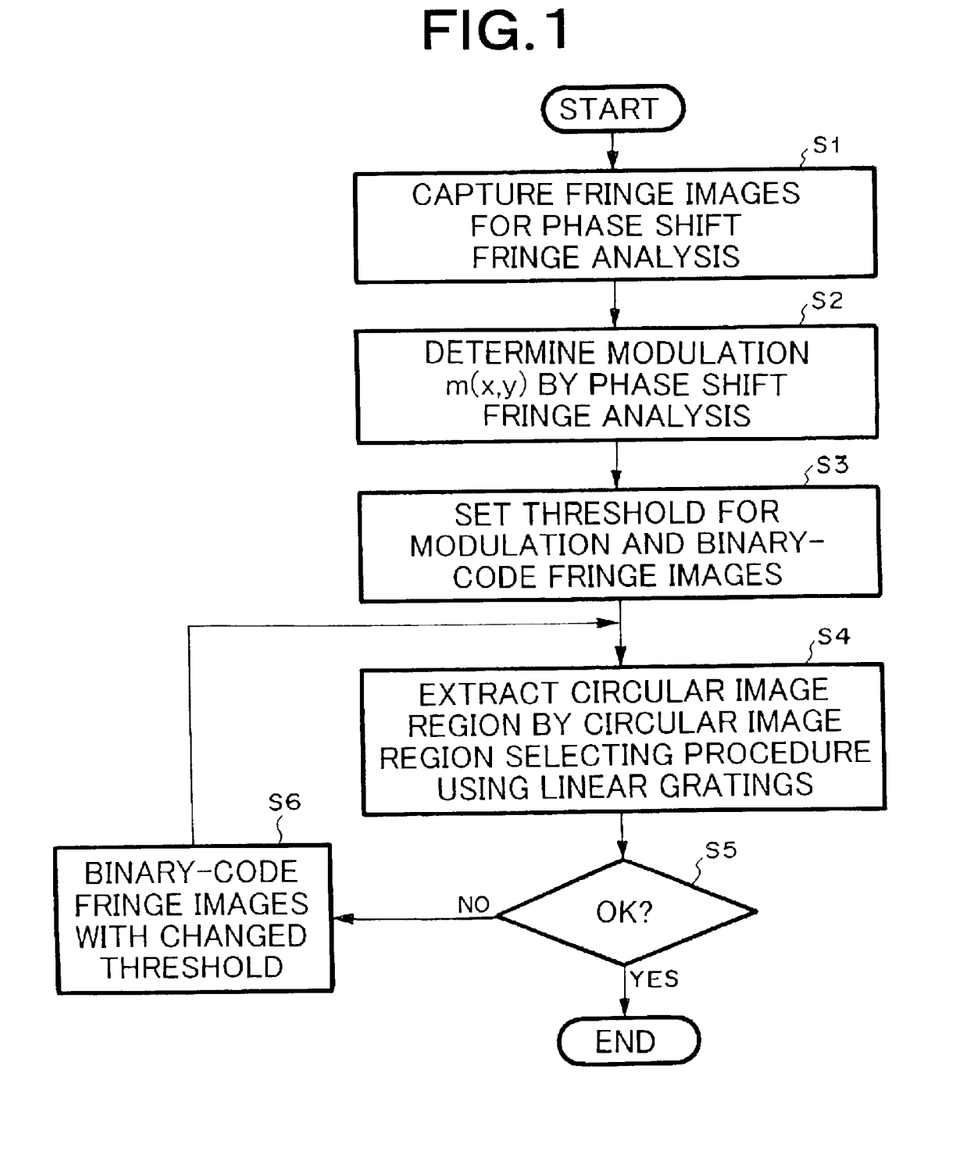
FIG. 1 is a flowchart showing a schematic procedure of the method in accordance with a first embodiment of the present invention.

To begin with, an outline of the method of extracting a circular region from a fringe image in accordance with a first embodiment of the present invention will be explained with reference to FIG. 1. FIG. 1 is a flowchart showing a schematic procedure of the method in accordance with the first embodiment of the present invention.

The method in accordance with the first embodiment uses a phase shift fringe analysis method. The phase shift fringe analysis method, which is also known as fringe scanning fringe analysis method, changes the optical path length difference between object light and reference light by changing the gap between a reference surface and a sample in an interferometer apparatus, and determines the phase distribution of the sample according to the change in interference fringes (interference fringe shift) at that time.

First, a plurality of fringe images for the phase shift fringe analysis method for a sample (e.g., ferrule) having a circular region to be analyzed within an area to be observed, i.e., fringe images whose fringe patterns are shifted in several stages with respect to one area to be observed, are captured onto a predetermined coordinate system (S1). Thus captured fringe images have respective interference fringe intensity distributions shifted from each other because of their shifted fringe patterns. According to these plurality of fringe images, various kinds of fringe intensity information corresponding to individual pixels on the coordinate system, such as changes in the light intensity, contrast, sharpness (also known as "visibility"), or modulation of images can be obtained. In the method of the first embodiment, an algorithm of the phase shift fringe analysis method is used for determining the modulation m (x, y) of each pixel on the coordinate system (S2). The procedure for determining the modulation will be explained later.

Subsequently, a threshold for the modulation is set, and a binary coding procedure is carried out for dividing, on the coordinate system, the fringe images of the area to be observed into an image region whose modulation is not lower than the threshold, and an image region whose modulation is lower than the threshold (S3). Then, using a circular image region selecting procedure which will be explained later, a circular image region representing the circular region to be analyzed is extracted on the coordinate system subjected to the binary coding (S4).

It is determined whether the extraction of the circular image region is in success or not (S5). If not, while changing the threshold to another value, the binary coding procedure for dividing the fringe images of the area to be observed into two image regions is carried out again (S6), and then the flow returns to the above-mentioned step S4. If the extraction of the circular image region is in success, then the operation of extracting the circular image region is terminated.

Since the reflectance varies between an optical fiber and a ferrule body in a ferrule, the optical fiber region and a region outside thereof can be discriminated from each other if the modulation is determined.

Circular Image Region Selecting Procedure

Figure 2:
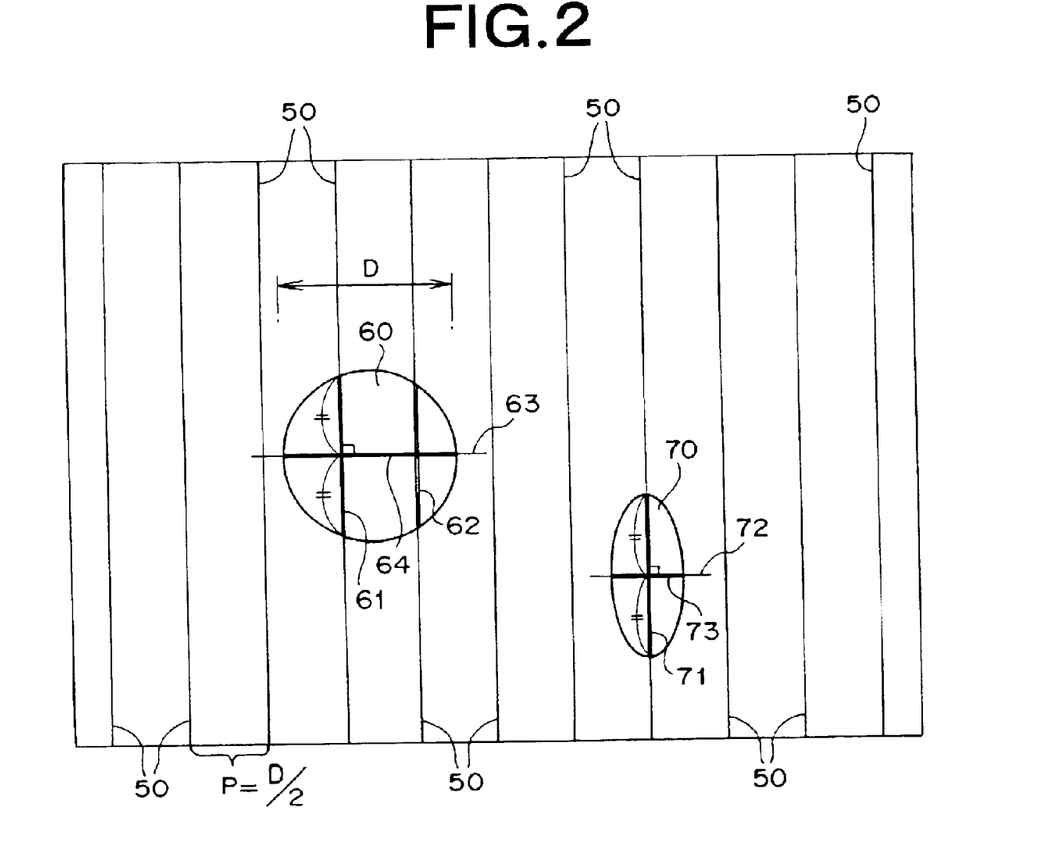
FIG. 2 is a schematic view for explaining an example of circular image region selecting procedure.

With reference to FIG. 2, the circular image region selecting procedure will now be explained. FIG. 2 is a schematic view for explaining an example of the circular image region selecting procedure.

As shown in FIG. 2, on the coordinate system of the image divided into two regions by the binary coding procedure, a plurality of linear gratings 50 are initially disposed in parallel with each other with an interval P which is ½ of the diameter D of the circular image region. In FIG. 2, it is assumed that two image regions, i.e., an image region 60 corresponding to the circular image region and an image region 70 not corresponding thereto are discriminated from their outside image regions by the binary coding procedure, so as to be taken as candidate regions for the circular image region.

Subsequently, the respective lengths L of segments 61, 62, 71 included in the image regions 60, 70 are measured, and it is determined whether they fall within the suitable length range represented by the following expression (1):

$$\sqrt{3}D/2 \leq L \leq D \tag{1}$$

where D is the diameter of the circular image region.

When the interval P of the linear gratings 50 is set to ½ of the diameter D of the circular image region, at least 1 and not greater than 2 segments constituted by a part of the linear gratings 50 are located within the image region 60 corresponding to the circular image region, whereas the length of the longer one thereof always falls within the suitable length range represented by the above-mentioned expression (1). Therefore, an image region corresponding to the circular image region can always be recognized, whereas the number of segments whose length must be measured can be kept small.

Without being restricted to ½ of the diameter D of the circular image region, the interval P of the linear gratings 50 can be set to any length not greater than the diameter D. As the interval P is greater than ½ of the diameter D, however, the suitable length range must be made wider in order for image region corresponding to the circular image region to be always recognized, which also increases the number of segments whose length must be measured. As the interval P is smaller than ½ of the diameter D, the suitable length range can be made narrower, but the number of linear gratings becomes greater, whereby the number of segments whose length must be measured increases as well. In view of such circumstances, the interval P set so as to satisfy the following expression (2) is preferable in that it can suppress the number of segments whose length must be measured:

$$\sqrt{3}D/2 \geq P \geq D/10 \tag{2}$$

where D is the diameter of the circular image region.

If segments whose lengths fall within the above-mentioned suitable length range exist, respective perpendicular bisectors 63, 72 for these segments 61, 71 are formed on the coordinates, and respective lengths of diameter candidate segments 64, 73 constituted by the parts of perpendicular bisectors 63, 72 included within the image regions 60, 70 acting as the candidate regions are measured. Then, it is determined whether each of the respective lengths of the diameter candidate segments 64, 73 substantially equals the above-mentioned diameter D (e.g., falls within a length range in which the length of several pixels is added to or subtracted from the diameter D) or not.

If the diameter candidate segment 64 substantially equal to the diameter D exists according to this determination, the image region 60 including the diameter candidate segment 64 is taken as a candidate region for the circular image region. Since only one image region 60 corresponding to a candidate region exists in FIG. 2, this image region 60 is defined and extracted as the circular image region. If the circular image region cannot be defined by a single circular image region selecting procedure, a circular image region selecting procedure similar to that mentioned above is repeatedly carried out each time the inclination of the linear gratings is changed while changing the inclination of the linear gratings until the circular image region can be defined, so as to extract the circular image region.

Procedure of Specifying Center Position in Circular Image Region

Two methods will now be explained as a procedure of specifying the center position of the circular image region extracted by the circular image region selecting procedure.

The first center position specifying procedure determines the center position of the diameter candidate segment 64 (see FIG. 2) considered substantially equal to the diameter D of the circular image region in the circular image region selecting procedure, and takes this center position as the center position of the circular image region. Here, the circular image region selecting procedure may be carried out a plurality of times, so as to determine respective center positions of diameter candidate segments, and then the obtained center positions can be averaged.

The second center position specifying procedure determines, according to the area of binary-coded image of the circular image region determined in the circular image region selecting procedure, a gravity center position of the circular image region, and takes this gravity center as the center position of the circular image region. Various methods conventionally known in the field of image processing can be used as the method of determining the center of gravity.

Second Embodiment

Figure 3:
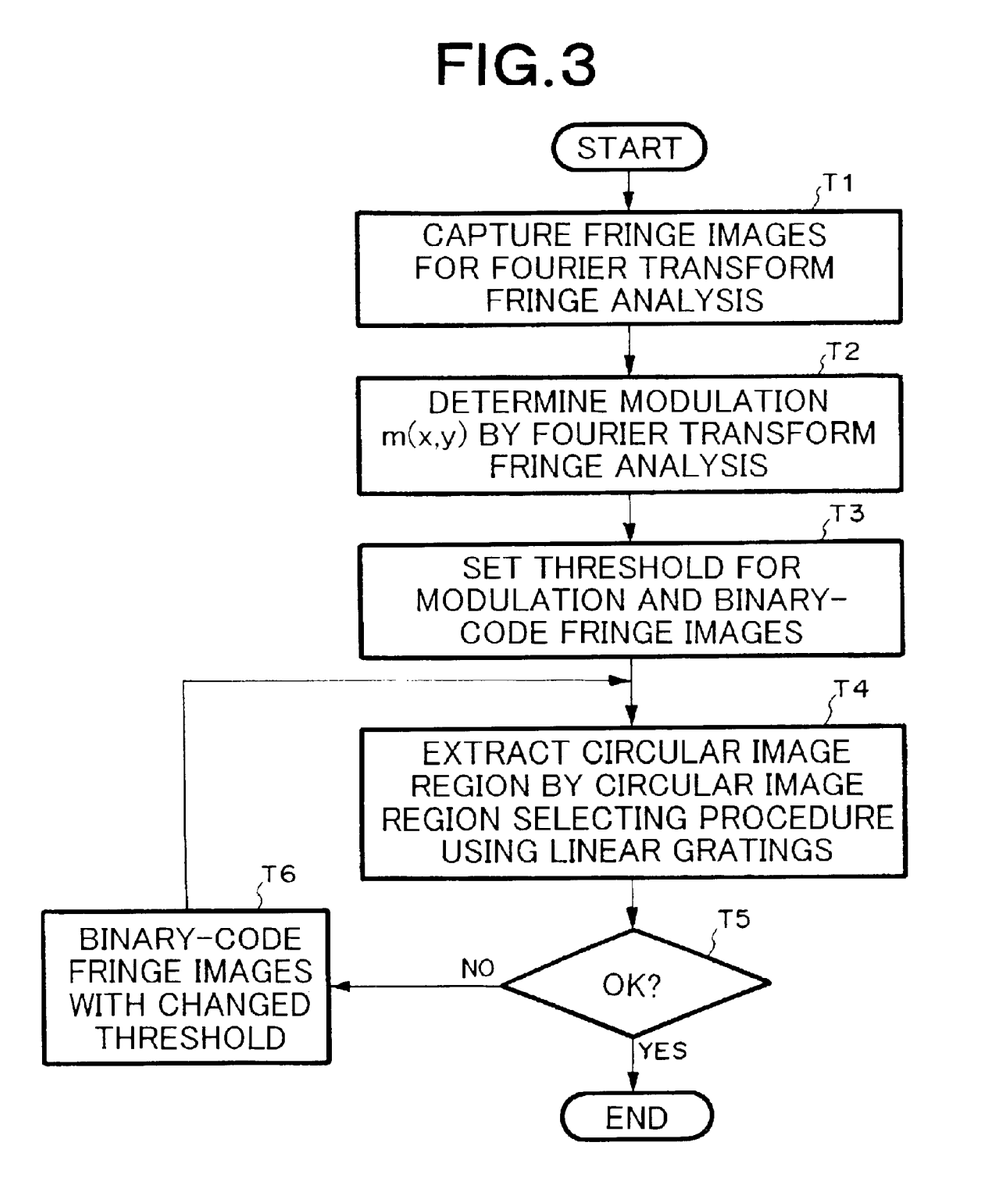
FIG. 3 is a flowchart showing a schematic procedure of the method in accordance with a second embodiment of the present invention.

With reference to FIG. 3, an outline of the method of extracting a circular region from a fringe image in accordance with a second embodiment of the present invention will now be explained. FIG. 3 is a flowchart showing a schematic procedure of the method in accordance with the second embodiment of the present invention.

The method in accordance with the second embodiment uses a Fourier transform fringe analysis method. This Fourier transform fringe analysis method is a method imparting an inclination to a sample or a reference surface, so as to capture a fringe image superposed with a spatial frequency, and subjecting thus captured fringe image data to a series of Fourier transform operations, so as to determine a phase distribution of the sample according to the results of operations.

First, a fringe image for the above-mentioned Fourier transform analysis method, i.e., a fringe image superposed with a spatial carrier frequency, with respect to a sample (e.g., ferrule) having a circular region to be analyzed within an area to be observed is captured onto a predetermined coordinate system (T1). Thus captured fringe image is subjected to a predetermined Fourier transform operation, and the modulation m (x, y) corresponding to each pixel on the coordinate system is determined from the result of operation (T2). A procedure of determining the modulation will be explained later.

Subsequently, while setting a threshold for the modulation, a binary coding procedure is carried out so as to divide, on the coordinate system, the fringe image into an image region whose modulation is not lower than the threshold, and an image region whose modulation is lower than the threshold (T3). Then, using the above-mentioned circular image region selecting procedure, a circular image region corresponding to the circular region to be analyzed on thus binary-coded coordinate system is extracted (T4).

It is determined whether the extraction of the circular image region is a success or not (T5). If not, while changing the threshold to another value, the binary coding procedure for dividing the fringe image of the area to be observed into two image regions is carried out again (T6), and then the flow returns to the above-mentioned step T4. If the extraction of the circular image region is a success, then the operation of extracting the circular image region is terminated. Here, the circular image region selecting procedure is the same as that explained in the first embodiment.

Modulation Calculating Process

In the following, an example of the modulation calculating procedures in the above-mentioned phase shift fringe analysis method and Fourier transform fringe analysis method will be explained by using expressions.

1) Calculation of Modulation in Phase Shift Fringe Analysis Method

It will be explained with reference to a 5-bucket phase shift method, which is often used currently, by way of example. First, while shifting the reference surface of an interferometer apparatus five times by using a highly accurate actuator such as a piezoelectric device (hereinafter simply referred to as "PZT"), light intensities $i_0$ to $i_4$ are determined at the respective shift stages. By using thus determined light intensities $i_0$ to $i_4$, the phase of thus captured fringe image is represented by the following expression (3):

$$\varphi(x, y) = \arctan\left(\frac{2(i_1 - i_3)}{2i_2 - (i_0 + i_4)}\right) \quad (3)$$

The modulation m (x, y) in the 5-bucket phase shift method can be determined by the following expression (4) or (5):

$$m(x, y) = \frac{\sqrt{(i_1 - i_3)^2 + (i_0 - i_2)^2}}{2} \quad (4)$$

$$m(x, y) = \frac{\sqrt{(i_1 - i_3)^2 + (i_0 + i_4 - 2i_2)^2}}{2} \quad (5)$$

2) Calculation of Modulation in Fourier Transform Fringe Analysis Method

Letting $f_x$ and $f_y$ be the x- and y-direction components of a spatial carrier frequency, respectively, interference fringe image data obtained in a fringe image superposed with the spatial carrier frequency is represented by the following expression (6):

$$i(x,y) = a(x,y) + b(x,y)\cos(2\pi f_x x + 2\pi f_y y + \phi(x,y)) \quad (6)$$

where
a (x, y) is the background of interference fringes;
b (x, y) is the visibility of fringes;
ϕ (x, y) is the phase of the object to be measured; and
$f_x$, $f_y$ are carrier frequencies.

The above-mentioned expression (6) is deformed into the following expression (7):

$$i(x,y) = a(x,y) + c(x,y)e^{i(2\pi f_x x + 2\pi f_y y)} + c^*(x,y)e^{i(2\pi f_x x + 2\pi f_y y)} \quad (7)$$

where c*(x, y) is a complex conjugate of c (x, y).

Here, c (x, y) is represented by the following expression (8):

$$c(x, y) = \frac{b(x, y)e^{i(\varphi(x,y))}}{2} \quad (8)$$

The above-mentioned expression (6) is Fourier-transformed into the following expression (9):

$$I(\eta,\zeta) = A(\eta,\zeta) + C(\eta - f_x, \zeta - f_y) + C^*(\eta + f_x, \zeta + f_y) \quad (9)$$

where A (η, ζ) is the Fourier transform of a (x, y), whereas C (η−$f_x$, ζ−$f_y$) and C*(η+$f_x$, ζ+$f_y$) are the respective Fourier transforms of c (x, y) and c*(x, y).

By filtering, the second term component of the above-mentioned expression (9) is taken out alone, and the spatial carrier frequency ($f_x$, $f_y$) is extracted according to the spectrum peak located at the coordinates ($f_x$, $f_y$) on the frequency coordinate system.

On the other hand, thus obtained C (η−$f_x$, ζ−$f_y$) is expanded on the frequency coordinate system, and the spectrum peak located at the coordinates ($f_x$, $f_y$) is moved to the origin on the frequency coordinate system, so as to eliminate the spatial carrier frequency. Thereafter, inverse Fourier transform is carried out, so as to determine c (x, y), thereby yielding the imaginary part of the following expression (10):

$$\varphi(x, y) = \tan^{-1}\frac{\mathrm{Re}[c(x, y)]}{\mathrm{Im}[c(x, y)]} \quad (10)$$

thus obtaining the wrapped phase.

Then, the modulation m (x, y) in the Fourier transform analysis method can be determined by the following expression (11):

$$m(x, y) = \frac{1}{2}\sqrt{\{\mathrm{Re}[c(x, y)]\}^2 + \{\mathrm{Im}[c(x, y)]\}^2} \quad (11)$$

Interferometer Apparatus

Figure 4:
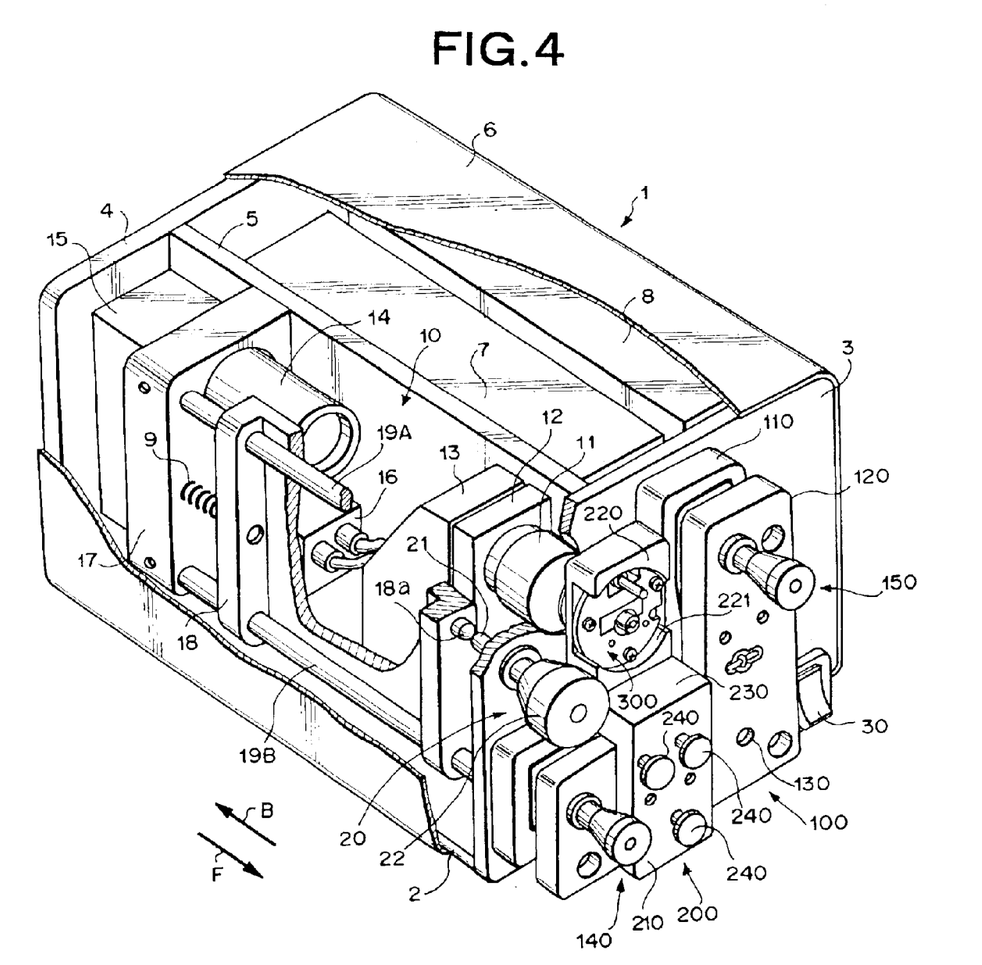
FIG. 4 is a perspective view of a microscopic interferometer apparatus for carrying out the method of the present invention.

An interferometer apparatus for carrying out the method in accordance with each of the above-mentioned embodiments will now be explained with reference to FIG. 4. FIG. 4 is a partly cutaway perspective view showing a microscopic interferometer apparatus for carrying out the method of the present invention.

The microscopic interferometer apparatus 1 shown in FIG. 4 comprises a main housing constituted by a bottom plate 2, a front plate 3 (depicted in a partly cutaway fashion), a rear plate 4, a partition 5, and a cover case 6 (depicted in a partly cutaway fashion), whereas a power supply 7, a control box 8, and a main system 10 are disposed within the main housing.

The main system 10 comprises an objective lens unit 11, a piezoelectric unit 12, a half mirror/light source unit 13, an imaging lens unit 14, a mirror box 15, and a CCD camera unit 16. Among them, the imaging lens unit 14, mirror box 15, and CCD camera unit 16 are attached to a stationary table 17 secured to the partition 5, whereas the objective lens unit 11, piezoelectric unit 12, and half mirror/light source unit 13 are attached to a focus table 18 (depicted in a partly cutaway fashion).

The focus table 18 is supported by upper and lower guide shafts 19A, 19B (depicted in a partly cutaway fashion) extending in parallel in back and forth directions (indicated by arrows B and F in the drawing), so as to be slidable back and forth. A coil spring 9 is disposed between the stationary table 17 and the focus table 18, so that the focus table 18 is urged forward (in the direction of arrow F in the drawing) by the elasticity of the coil spring 9.

The front plate 3 is provided with a focus adjustment screw 20 for moving the focus table 18 so as to carry out focus adjustment of the main system 10. This focus adjustment screw 20 comprises a screw shaft 21 threaded into an undepicted screw hole formed in the front plate 3 so as to be movable back and forth when rotating about its axis, and a knob 22 for rotating the screw shaft 21. The leading end face of the screw shaft 21 abuts against a semispherical protrusion 18a disposed at the front face part of the focus table 18. As the length of screw shaft 21 projected from the front plate 3 is changed by rotating the knob 22, the focus adjustment screw 20 can move the focus table 18 back and forth along the guide axes 19A, 19B, thus enabling focus adjustment.

The interferometer main system 10 having the above-mentioned configuration irradiates a minute sample (e.g., a ferrule) held at a predetermined position in front of the objective lens unit 11 with a part of laser light from an undepicted light source separated from reference light. The object light reflected from the sample is caused to interfere with the reference light. Thus generated interference light passes through an imaging lens system (not depicted) within the imaging lens unit 14, and then forms an image of interference fringes onto an undepicted CCD. When forms and changes of thus obtained interference fringes are measured and analyzed, the three-dimensional measurement of the surface form of the sample and the physical property measurement thereof can be carried out. By driving the PZT within the piezoelectric unit 12, the phase shift fringe analysis method and Fourier transform fringe analysis method can be carried out. Employable as the interferometer main system 10 are various types such as those of Mireau, Michelson, and Linnik.

The front plate 3 is provided with an inclination adjusting apparatus 100. The inclination adjusting apparatus 100 comprises an L-shaped first base member 110 secured to the front plate 3, and a second base member 120 having an L-shape similar to the first base member 110 and opposing the first base member 110. The second base member 120 is supported so as to be inclinable with respect to the first base member 110 while using a support part 130 acting as a fulcrum, and is adapted to tilt about an axis extending in a substantially horizontal direction from the support part 130 and about an axis extending in a substantially vertical direction from the support part 130 by first and second adjusting parts 140, 150, respectively, so as to adjust the inclination with respect to the first base member 110.

A clamping apparatus holder 200 is attached to the second base member 120 of the inclination adjusting apparatus 100. The clamping apparatus holder 200 comprises a front part 210, a rear part 220, and a connecting part 230 connecting them, whereas the front part 210 is fastened by three attachment screws 240 to the second base member 120. The rear part 220 of the clamping apparatus holder 200 is positioned on the front face side of the objective lens unit 11, whereas its center part is formed with a holder depression 221 for holding a clamping apparatus 300 therein. The front plate 3 is further provided with a power switch 30 for turning ON/OFF the power of the microscopic interferometer apparatus 1.

Though embodiments of the present invention are explained in the foregoing, the present invention can be modified in various manners without being restricted to the above-mentioned embodiments.

For example, though the above-mentioned embodiments relate to a ferrule for optical communications as a sample having a circular region to be analyzed within an area to be observed, the method of the present invention can be employed for extracting a circular region to be analyzed from fringe images of various samples having such a circular region.

Also, the interferometer apparatus for carrying out the method of the present invention is not limited to the above-mentioned microscopic interferometer apparatus, whereby various types of interferometer apparatus can be used.

Further, fringe intensity information corresponding to each pixel on the coordinate system used for discriminating a circular image region from its outside image region is not limited to the above-mentioned modulation. The light intensity, contrast, or sharpness of images may also be used as the fringe intensity information.

As explained in detail in the foregoing, the method of extracting a circular region from a fringe image in accordance with the present invention captures onto a predetermined coordinate system a fringe image of a sample having a circular region to be analyzed within an area to be observed, binary-codes the fringe image of the area to be observed by a predetermined fringe analysis method on the coordinate system, places a plurality of linear gratings in parallel with each other with a predetermined interval on thus binary-coded coordinate system, and uses the linear gratings so as to carry out a circular image region selecting procedure for extracting a circular image region representing the region to be analyzed on the coordinate system, thereby yielding the following effects:

Namely, the circular image region selecting procedure carried out by using the linear gratings requires only an arithmetic operation of measuring the length of the segment of a linear grating included within a candidate region and determining whether or not the length of the segment falls within a predetermined suitable length range, and an arithmetic operation of forming a perpendicular bisector of the positively determined segment on the coordinate system, measuring the length of the segment of perpendicular bisector included within the candidate region, and determining whether or not the length of the segment substantially equals the diameter of the circular image region. Therefore, the amount of arithmetic operation for extracting the circular image region can be kept small, whereby the circular image region can be extracted at a high speed.

What is claimed is:

1. A method of extracting a circular region from a fringe image by capturing onto a predetermined coordinate system a fringe image in an area to be observed of a sample having a circular region to be analyzed within said area to be observed, and extracting a circular image region representing said region to be analyzed on said coordinate system;

said method comprising the steps of:

(i) carrying out a binary coding procedure, said binary coding procedure determining fringe intensity information of each pixel on said coordinate system by a predetermined fringe analysis method, determining according to thus determined fringe intensity information a threshold for binary-coding said fringe image in said area to be observed, and discriminating a candidate region having a fringe intensity level of said circular image region in said fringe image and a noncandidate region having a fringe intensity level of a region outside said circular image region from each other by said binary coding according to thus set threshold;

(ii) placing, on said coordinate system subjected to said binary coding procedure, a plurality of linear gratings in parallel with each other with a predetermined interval P shorter than said diameter D of said circular image region;

(iii) measuring the length of a segment constituted by a part of said linear gratings included within said candidate region;

(iv) determining whether or not the length of said segment falls within a predetermined suitable length range of said diameter D or shorter; and (v) carrying out a circular image region selecting procedure, said circular image region selecting procedure placing on said coordinate system a perpendicular bisector of said segment determined to fall within said range, measuring the length of a diameter candidate segment constituted by a part of said perpendicular bisector included within said candidate region, determining whether or not the length of said diameter candidate segment substantially equals said diameter D, and taking an image region including thus positively determined diameter candidate segment as a chosen candidate region of said circular image region, or carrying out said circular image region selecting procedure a plurality of times while changing an inclination of said linear gratings;

thereby defining and extracting said circular image region.

2. A method according to claim 1, further comprising a first center position specifying procedure determining, after said circular image region is extracted by said circular image region selecting procedure, a center position of said diameter candidate segment included in said circular image region and taking thus determined center position as a center position of said circular image region.

3. A method according to claim 1, further comprising a second center position specifying procedure determining, after said circular image region is extracted by said circular image region selecting procedure, a gravity center position of said circular image region according to the area of said circular image region and taking thus determined gravity center position as a center position of said circular image region.

4. A method according to claim 1, wherein said predetermined interval P is set within the range of the following expression:

$$\sqrt{3}D/2 \geq P \geq D/10$$

where D is the diameter of said circular image region.

5. A method according to claim 1, wherein said predetermined fringe analysis method is a phase shift fringe analysis method.

6. A method according to claim 1, wherein said predetermined fringe analysis method is a Fourier transform fringe analysis method.

7. A method according to claim 1, wherein said fringe intensity information is modulation.

* * * * *